United States Patent

Vidaillac

[11] Patent Number: 6,034,607
[45] Date of Patent: Mar. 7, 2000

[54] ELECTRONIC REFRIGERATION UNIT TEMPERATURE ALARM

[76] Inventor: Pierre Vidaillac, 1512, Boul, Saint-Antoine, Quebec, Canada, J7Z 5T4

[21] Appl. No.: 09/213,160

[22] Filed: Dec. 17, 1998

Related U.S. Application Data

[60] Provisional application No. 60/069,841, Dec. 17, 1997.

[51] Int. Cl.⁷ .................................................. G08B 21/00
[52] U.S. Cl. .............................. 340/585; 62/126; 62/127; 62/129; 340/529; 340/588; 340/589
[58] Field of Search .................................... 340/585, 588, 340/589, 527, 529; 62/126, 127, 129

[56] References Cited

U.S. PATENT DOCUMENTS

| | | | |
|---|---|---|---|
| 4,146,886 | 3/1979 | Timblin | 340/585 |
| 4,490,986 | 1/1985 | Paddock | 340/527 |
| 4,604,871 | 8/1986 | Chiu et al. | 340/588 |
| 5,262,758 | 11/1993 | Nam et al. | 340/585 |
| 5,917,416 | 6/1999 | Read | 340/585 |

*Primary Examiner*—Glen Swann
*Attorney, Agent, or Firm*—James Anglehart; Swabey Ogilvy Renault

[57] ABSTRACT

An electronic freezer thermometer alarm computes an estimation of contents temperature in a freezer from the freezer air temperature. The calculated contents temperature is displayed by a LCD display and is used to trigger a sound alarm, by use of a piezoelectric buzzer, in case of too high a value. Alternatively, the freezer air temperature is used to start a timer that triggers the alarm several minutes after the freezer air temperature have risen above the limit value. In this case, the displayed temperature is the freezer air temperature. In both cases, freezer air temperature acquisition is done by the resistance measurement of a thermoresistor placed into a small case constituting the temperature probe. The thermometer housing has two magnets to keep on freezer external surface. The temperature probe is connected to the housing by a small thickness of wire going under the freezer door gasket. The thermometer is energized by a lithium battery placed into the case. The housing encloses a printed circuit board on which are off-the-shelf electronics components.

19 Claims, 2 Drawing Sheets

ELECTRONIC REFRIGERATION UNIT TEMPERATURE ALARM

This application claims benefit of provisional application No. 60/069,841, filed Dec. 17, 1997.

FIELD OF THE INVENTION

The present invention relates to a method of initiating an alarm in a refrigeration unit, such as a freezer, should it fail to function correctly. Specifically, the present invention relates to a method of calculating the temperature of the contents of the unit and initiating an alarm if it rises above a predetermined level.

BACKGROUND OF THE INVENTION

In the operation of a refrigeration unit, such as a freezer, it is often critical that the contents thereof, food for example, be kept below a certain temperature. This may be necessary, for example, to avoid spoilage of food.

When a refrigeration unit fails to function correctly, whether as a result of a power failure or some other cause, the air inside the unit is not kept sufficiently cool. Freezer and refrigerator alarms have been developed which measure air temperature within the unit and initiate an alarm should the temperature rise above a certain level. U.S Pat. 5,262,758 (Nam et al.) and U.S. Pat. 4,490,986 (Paddock) each disclose a system in which an alarm is initiated only after a certain air temperature has been exceeded for a certain length of time.

However, generally speaking, the temperature of the air inside the refrigeration unit is of secondary concern. The primary concern is that the temperature of the contents of the unit not rise above a critical level. But, these alarm delays do not take into account a number of other factors which may affect the temperature of the contents, such as the amount by which the air temperature inside the unit exceeds a critical level or the temperature of the contents, or the quantity of contents inside the freezer.

SUMMARY OF THE INVENTION

Accordingly, it is an object of the present invention to provide a method and apparatus of predicting the temperature of the contents of a refrigeration unit, such as a freezer, based on the air temperature inside the unit over a period of time.

According to the invention, there is provided a method of predicting the temperature of contents of a refrigeration unit, such as a freezer, comprising the steps of (i) measuring the temperature of the air in the freezer over a period of time; (ii) calculating a predicted value of the temperature of the freezer contents based on the freezer air temperature over a period of time; and; (iii) indicating said predicted value.

The invention also provides an apparatus for predicting the temperature of contents of a freezer comprising a temperature measuring device for generating a signal representing a temperature of the air in the freezer over a period of time, calculating means for calculating a predicted value of the temperature of the freezer contents based on the signal over a period of time, and an indicator for indicating the predicted value.

Preferably, the predicted or calculated contents value is determined by iterative calculation beginning from a time when the air temperature begins to rise above a normal low steady-state temperature.

DETAILED DESCRIPTION OF A PREFERRED EMBODIMENT

At <<power on>>, the system is in a so called <<hot>> mode in which the refrigeration unit's air temperature is displayed. After the freezer air temperature has dropped below −10° C. for several minutes, the systems enters a <<cold>> mode. In cold mode, the displayed temperature is the calculated contents temperature. The calculation of contents temperature at time t is made from the refrigeration unit's air temperature at time t and from the calculated contents temperature at time t−Dt. Dt is a period of about sixty seconds. When the system switches from hot to cold mode, calculated contents temperature is initialized to the unit's air temperature.

Figure 1:
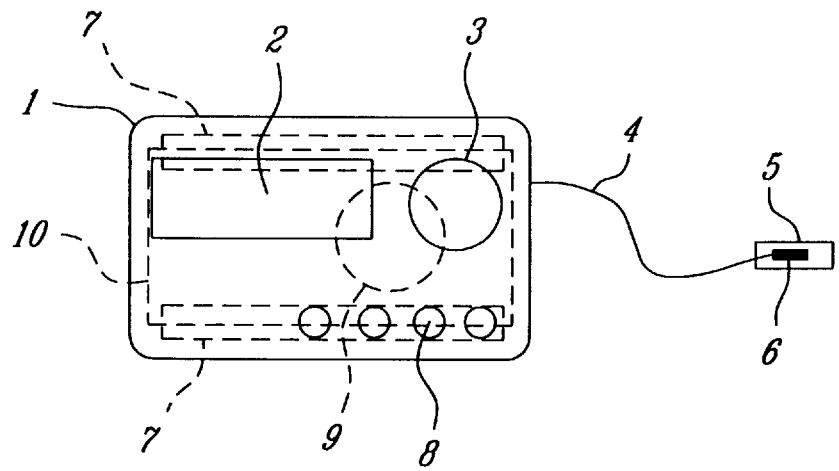
FIG. 1 shows a top view of the components of a preferred embodiment of the refrigeration unit thermometer alarm incorporating the present invention.
Figure 2:
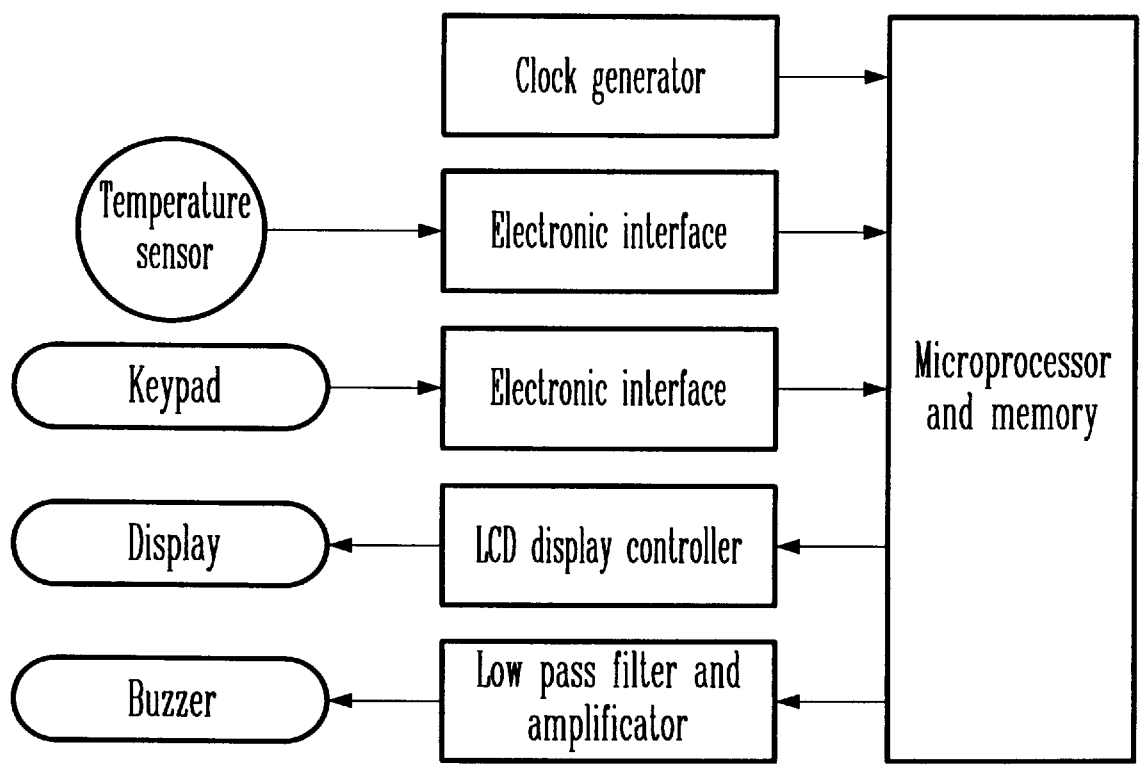
FIG. 2 shows a functional diagram of the electronic circuitry of the same preferred embodiment.

As illustrated in FIG. 1, if the calculated contents temperature rises above a limit, the apparatus 1 makes the piezoelectric buzzer 3 sound at regular time intervals. A high temperature alarm icon is displayed on LCD screen 2. The system stays in alarm until an alarm acknowledgment key 8 is pressed and as long as power is supplied by the lithium battery 9. The period of time between two alarm sounds is significantly increased after 24 hours of alarm condition, keeping the battery life as long as possible. After the acknowledgment key is pressed, the apparatus returns to the hot mode as it was after power on. The apparatus 1 is mounted to a freezer door by magnets 7, and has a thermal sensor 6, such as a temperature sensing resistor, in a probe 6 connected by wire 4 to the apparatus. The probe 5 is placed inside the freezer, and the small gage wire 4 runs from inside the freezer to the outside without disrupting thermal insulation of the freezer. The apparatus 1 has a printed circuit board 10 having off-the-shelf components, such as a microcontroller and memory for providing the required logic and control functions for measuring, recording and evaluating temperatures, as further described hereinbelow.

The system is equipped with a maximum temperature memory function. This memory is initialized at refrigeration unit air temperature when the apparatus switches from hot to cold mode. This maximum is displayed at any time, flashing, by pressing a dedicated key. A second press on this key while maximum temperature is flashing resets the maximum memory at current temperature that is calculated temperature or air temperature depending on apparatus mode.

While in cold mode, the system computes the air temperature gradient, which is used to detect defrost cycles. Indeed, the air temperature gradient at the beginning of defrost cycles is significantly greater than the air temperature gradient during normal operation or with the unit's power off, and significantly less than the air temperature gradient in open-door conditions, provided that the probe is near the door. When a defrost cycle is detected, the alarm detection scheme is disabled for about thirty minutes.

Functional description

Figure 3:
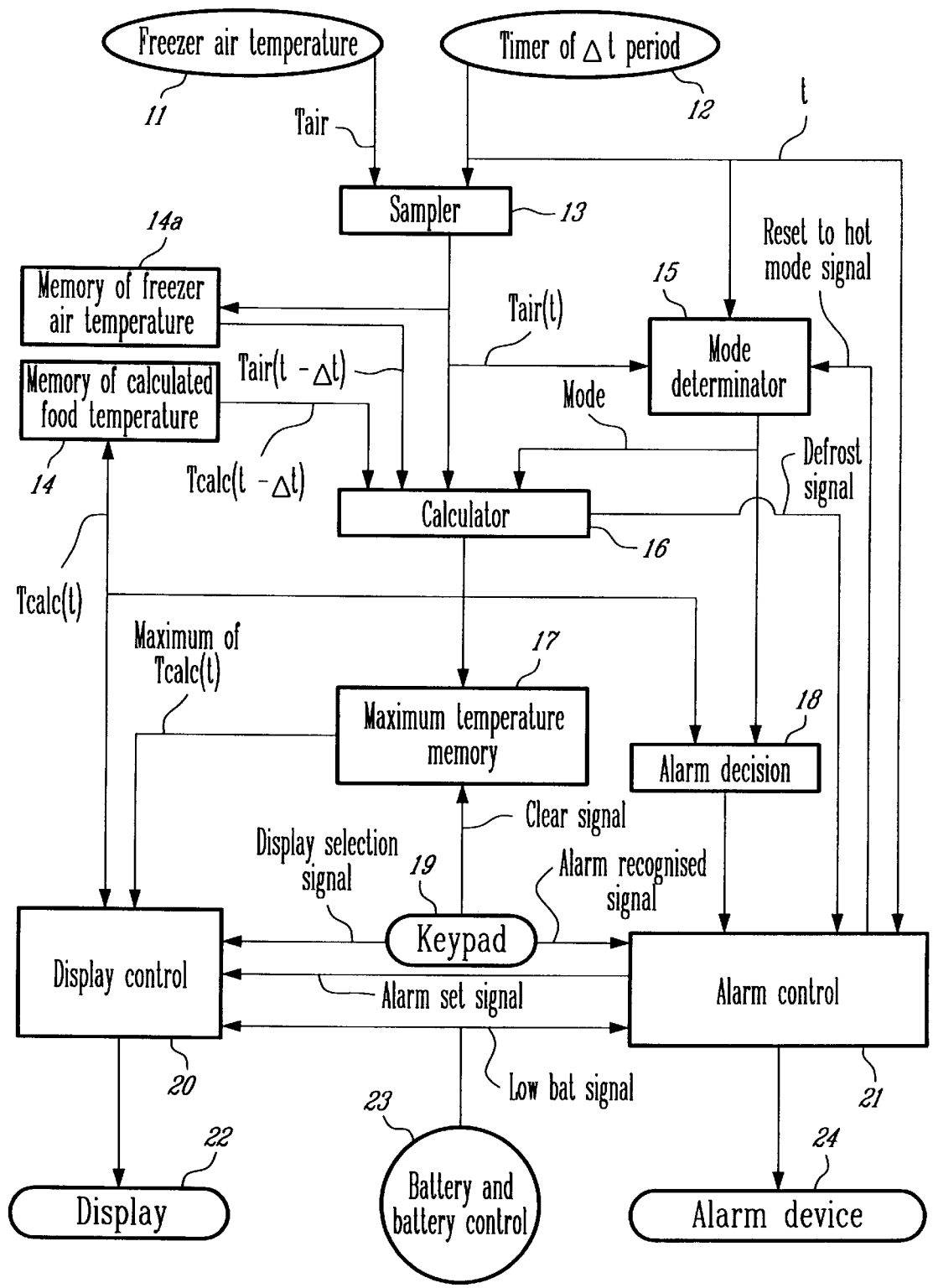
FIG. 3 is a functional diagram of the whole system of the same preferred embodiment.

As shown in FIG. 3, the refrigeration unit's air temperature 11, converted into electrical signal Tair is sampled and digitized at a Dt period giving signal Tair(t). Ticks of period Dt are generated by a clock 12 in the apparatus. The signal Tair(t) enters a memory block 14a at every period to be used as Tair(t–Dt) by the calculator 16 one period after. This memory block 14a is initialized to Tair(t) at power on. Signal Tair(t) is used by the mode determinator 15 to switch the system from hot mode to cold mode when Tair(t) drops below –10° C. for two consecutive Dt periods.

The calculator block 16 uses Tair(t) to compute Tcalc(t), which is the estimated contents temperature. In hot mode, Tcalc(t) is equal to Tair(t). In cold mode, Tcalc(t) is a function of Tair(t) and Tcalc(t–Dt). Tcalc(t–Dt) is the computed contents temperature one period before present time. This temperature is memorized at every period by the calculator 16 in a memory block 14. This memory block 14 is initialized at Tair(t) when the system enters cold mode. The calculator 16 updates at each Dt period the maximum value of Tcalc(t) in a memory block 17.

The calculation of Tcalc(t) is made according to the following formula:

$$Tcalc(t) = (Tcalc(t-Dt) * 10 + K)/11$$

Case 1: where K=1, if Tcalc(t–Dt)<0 and Tair(t)>=0
Case 2: where K=Tair(t), if Tcalc(t–Dt)<0 and Tair(t)<0
Case 3: where K=Tair(t), if Tcalc(t–Dt)>=0 and Tair(t)>=0

The formula does not apply where Tcalc(t–Dt)>=0 and Tair(t)<0. In that event, Tcalc(t)=Tair(t) and case 2 will apply.

Case 1 applies when the contents are frozen but the freezer air temperature is equal to or above 0° C. The curve of Tcalc resembles an exponential curve with an asymptote near 0. K is set at one to permit Tcalc to increase beyond 0° C. and enter Case 3.

Case 2 applies where the contents are frozen and the freezer air temperature is also below 0° C. The curve of Tcalc is an exponential curve with Tair as an asymptote.

Case 3 is similar to Case 2 where the temperatures of both the contents and the freezer air are above 0° C.

In Case 4, the contents are considered to have the same temperature as the freezer air. The contents have just been put in the freezer or the freezer has just begun freezing the contents.

The calculator 16 computes the air temperature gradient defined by $$\frac{Tair(t) - Tair(t - \Delta t)}{\Delta t}$$

When the gradient is above normal operation gradient and below gradient value in open-door conditions, the calculator 16 sets the defrost signal. The alarm decision block 18 uses Tcalc(t) to signal an alarm condition when Tcalc(t) is above a limit value and the apparatus is in cold mode. The alarm control block 21 triggers an alarm if the alarm condition is present for more than tvo consecutive Dt period and a defrost cycle is not pending. If the alarm control block receives the defrost signal with no alarm condition pending, the alarm triggering function is stopped for about thirty minutes.

When alarm is active, the buzzer sounds several seconds every period for the first 24 hours then one time every 10 periods until the Alarm recognized signal is generated by pressing the dedicated key on the keyboard 19 or the battery runs out of power. When alarm is active, the alarm control block 21 sends the Alarm set signal to the display block 20.

When receiving the Alarm recognized signal, the alarm control block 21 clears the alarm condition and sends the Reset to hot mode signal to the mode determinator 15 and the system returns to hot mode.

The display control block 20 sends to the display 22 either Tcalc(t) value or Tcalc(t) maximum value depending on display selection signal coming from the keypad 19. If the display control block 20 receives the Alarm set signal, an alarm icon is displayed. The memory block storing the maximum of Tcalc(t) 17 is reset by pressing a specialized key on the keyboard 19 sending the Clear signal.

The battery control block 23 measures the battery voltage and sets the Low bat signal if the voltage drops below a fixed limit. When the Display control block receives the Low bat signal a low battery condition icon is displayed. The low bat signal is also used by the alarm control block 21 to activate the buzzer 24 several seconds every ten Dt periods.

As a simpler alternative, Tcalc(t) is always equal to Tair(t). Therefore, the displayed temperature is always Tair (t). The number of consecutive periods of alarm condition, from the alarm decision block 18, required to trigger an alarm by the alarm control block 21 is set to twenty. Thus, the alarm is actually triggered about thirty minutes after Tair(t) have risen above a fixed limit, given that a period is about one minute thirty seconds. If Tair(t) returns below the limit temperature before the alarm is triggered, the periods counter is reset. The time required to trigger an alarm after Tair(t) has risen above the limit temperature may be increased to avoid defrost cycles detection, giving an even more simple design.

It will be appreciated that the calculation of the temperature of the contents of the freezer can be simplified or made more complex while remaining within the scope of the present invention. For example, it would be possible to monitor how long it takes for the temperature inside the freezer to rise from a first set point, eg. –9° C., to a second set point, eg. –2° C. The length of time varies depending on the nature of the contents of the freezer and on the outside temperature. Based on the time required for the set temperature rise, a prediction is made as to when the contents temperature will reach a critical alarm threshold, eg. 0° or 1° C. As long as the air temperature does not begin dropping, the alarm is triggered at the time when the temperature is predicted to be at the critical temperature. As an example of a more complex calculation method, all air temperature values are recorded at intervals over time. The air temperature values are analyzed simultaneously to determine characteristic parameters which are used to define a prediction function for the contents temperature.

I claim:

1. A method of predicting the temperature of contents of a freezer comprising the steps of:

measuring the temperature of the air in the freezer over a period of time;

calculating a predicted value of the temperature of the freezer contents based on the freezer air temperature over a period of time; and indicating said predicted value.

2. The method of predicting the temperature of freezer contents as defined in claim 1 wherein measurements of the freezer air temperature and the calculation of the predicted value of the freezer contents temperature are made at a predetermined frequency.

3. The method of predicting the temperature of freezer contents as defined in claim 2 wherein the calculation of the predicted value of the freezer contents temperature is based on both measured freezer air temperature and the predicted value of the freezer contents temperature calculated at a previous cycle of the predetermined frequency.

4. The method of predicting the temperature of freezer contents as defined in claim 2 including the additional steps of:

determining the rate of change of freezer air temperature over time; and inhibiting for a predetermined period of time the step of indicating the predicted value of the freezer contents temperature where said rate of change of freezer air temperature is greater than a first predetermined rate limit and less than a second predetermined rate limit.

5. The method of predicting the temperature of freezer contents as defined in claim 1 wherein the step of indicating the predicted value of the freezer contents temperature is by way of an audible alarm.

6. The method of predicting the temperature of freezer contents as defined in claim 5 wherein said audible alarm remains active until deactivated by a user.

7. The method of predicting the temperature of freezer contents as defined in claim 6 wherein said audible alarm is changed to consume less power where said audible alarm remains activated for a predetermined period of time.

8. The method of predicting the temperature of freezer contents as defined in claim 1 wherein the step of indicating the predicted value of the freezer contents temperature is disabled until the measured freezer air temperature falls below a predetermined freezer air temperature limit for a predetermined period of time.

9. The method of predicting the temperature of freezer contents as defined in claim 1 including the additional step of maintaining a record of the maximum predicted value of the freezer contents temperature.

10. The method as defined in claim 1, wherein said step of indicating said predicted value comprises providing a numeric display of said predicted value.

11. An apparatus for predicting the temperature of contents of a freezer comprising:

a temperature measuring device for generating a signal representing a temperature of the air in the freezer over a period of time;

calculating means for calculating a predicted value of the temperature of the freezer contents based on said signal over a period of time; and an indicator for indicating said predicted value.

12. The apparatus as defined in claim 11, wherein said calculating means calculates at discrete intervals at a predetermined frequency.

13. The apparatus as defined in claim 12, wherein said calculating means calculates the predicted value of the freezer contents temperature using both the measured freezer air temperature and the predicted value of the freezer contents temperature calculated at a previous cycle of the predetermined frequency.

14. The apparatus as defined in claim 11, wherein said indicator comprises an audible alarm signal generator.

15. The apparatus as defined in claim 14, wherein indicator comprises a deactivation input, wherein said audible alarm remains active until deactivated by a user.

16. The apparatus as defined in claim 15, wherein indicator comprises a power controller, wherein said audible alarm is changed to consume less power when said audible alarm remains activated for a predetermined period of time.

17. The apparatus as defined in claim 11, wherein said indicator is initially disabled until the measured freezer air temperature falls below a predetermined freezer air temperature limit for a predetermined period of time.

18. The apparatus as defined in claim 11, further comprising means for maintaining a record of the maximum predicted value of the freezer contents temperature.

19. The apparatus as defined in claim 11, wherein said indicator comprises a numeric display for displaying said predicted value.

* * * * *